2 Sheets—Sheet 2.
J. A. RISDON.
Horseshoe.
No. 202,758. Patented April 23, 1878.
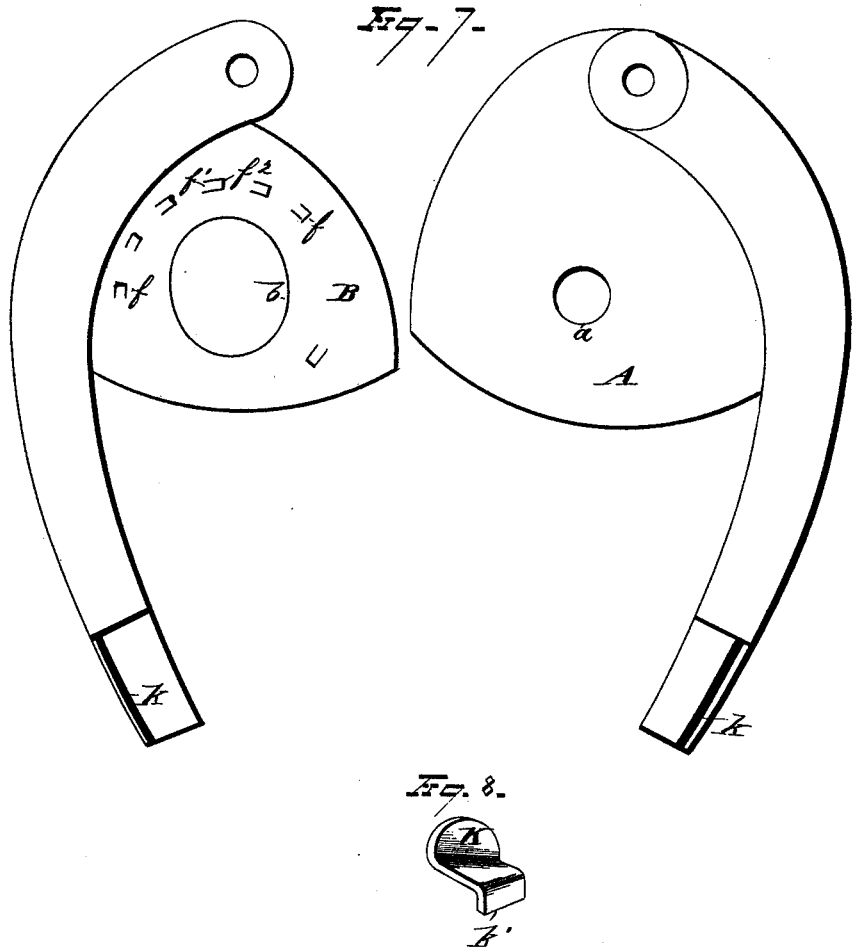
WITNESSES
Ed. J. Nothingham
A. W. Bright.
INVENTOR
J. A. Risdon.
By Leggett & Leggett
ATTORNEY

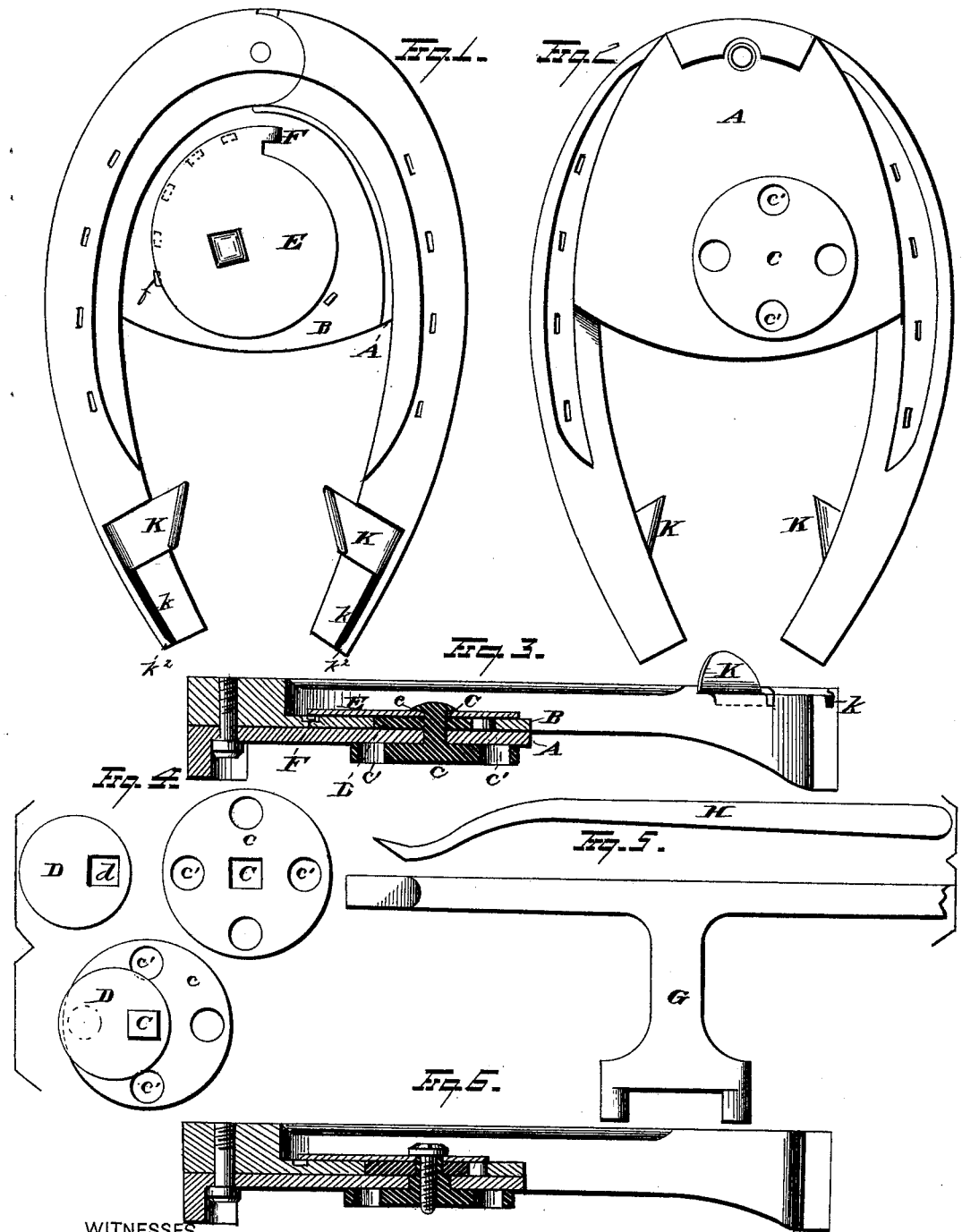

UNITED STATES PATENT OFFICE.

JAMES A. RISDON, OF SYCAMORE, ASSIGNOR OF ONE-HALF HIS RIGHT TO MARCELLUS WINTERS, OF FREEPORT, ILLINOIS.

IMPROVEMENT IN HORSESHOES.

Specification forming part of Letters Patent No. 202,758, dated April 23, 1878; application filed September 21, 1877.

*To all whom it may concern:*

Be it known that I, JAMES A. RISDON, of Sycamore, in the county of DeKalb and State of Illinois, have invented certain new and useful Improvements in Horseshoes; and I do hereby declare the following to be a full, clear, and exact description of the invention, such as will enable others skilled in the art to which it pertains to make and use it, reference being had to the accompanying drawings, which form part of this specification.

My invention relates to improvements in horseshoes for contracted hoofs; and consists of a toe-jointed shoe provided with metallic plates, one secured to each section of the shoe, and made with slots in their free marginal portions of different sizes. Within the larger slot a cam-disk works, having flat bearing against the inner face of the plate having the smaller slot, and secured in place by a square rivet or bolt, which latter passes through both the plates, and fits in a square slot formed in the cam-disk. The enlarged head of this rivet or bolt is adapted to rotate over the outer face of the lower plate, and is also provided with slots for engaging with a double-pronged key or wrench, by which the said bolt or rivet is turned. By operating this head the square rivet or bolt turns the cam-disk, which latter adjusts the engaging-plates nearer or farther from one another, thus throwing the shoe-branches out or in from the center of the hoof. To maintain such an adjustment of parts, a locking-plate is provided, fitting over that portion of the square rivet or bolt which projects out above the upper surface of the cam-disk, and this plate is made with an engaging finger or catch, which corresponds to and fastens in a graded series of notches formed on the upper face of the upper plate. This locking-plate is made of spring metal, and is adapted to be moved over the upper plate, either in contraction or enlargement of the shoe.

The rivet which is used to secure the cam-disk and engaging-plates together is preferably made solid, and its upper extremity is flanged over the spring locking-plate, while in case of using a bolt the latter is adapted to secure the parts by a screw engaging with the body of the bolt, and whose head has bearing upon the locking-plate.

To expand the shoe, the key, engaging with the head of the rivet or bolt, causes the cam-disk to turn in the larger slot of the engaging-plates, and upon reaching the proper degree of expansion the catch-finger of the spring-plate locks in its appropriate notch, which prevents any contraction of the shoe. As one side of each of these notches is made with an inclined plane instead of a square abrupt shoulder, the catch is allowed to be easily passed from out of one notch into the next by the operation of the key as the shoe is expanded, while the opposite vertical sides of the notches prevent the locking-plate catch from passing over or out of the notches in contracting the shoe, unless first the locking-plate is raised from off the face of the upper engaging-plate; but by inserting a small lever or wedge beneath the locking-plate the catch clears the notch, and the branches of the shoe can be brought together.

Referring to the drawings, Figure 1 shows the upper face of a shoe made according to my invention. Fig. 2 is a view of the opposite face. Fig. 3 is a section through the central length of the shoe. Fig. 4 shows parts in detail. Fig. 5 represents tools by which the parts are operated. Fig. 6 is a sectional view of a modification of the invention, according to which a bolt is used instead of a rivet in fastening the parts together. Fig. 7 represents, in plan view, the two sections of the shoe disconnected. Fig. 8 is a view showing my detachable heel-clip.

The shoe is preferably made of malleable iron, though other metal can instead thereof be used, and the two branches are secured together in a swinging joint; by a pivot or similar engaging device, a rivet being preferably used.

The plates A and B are secured to the shoe in any suitable manner; or they may be formed each in the same piece with their respective branches. The lower plate A, preferably formed with a toe-calk, has a slot, *a*, in its rear body, over which slides the upper plate B, provided with the slot *b*, larger than the slot *a*. The rivet C, passing through these slots from the exposed face of the lower plate, and also through the eccentric slot $d$ of the cam-disk D, is flanged over the upper face of the locking-plate E.

Instead of a rivet, a bolt provided with a screw, engaging in its tapped body, may be used, as before mentioned, and as shown in Fig. 6 of the drawing; but in practice I fasten the parts together by a rivet. This rivet has square sides fitting the slot $d$ of the cam-disk, so that by turning it the disk is also turned. So, too, the slot $e$ of the locking-plate is made square, and the latter is turned simultaneously with the rivet and cam.

The head $c$ of the rivet is formed as a circular plate, which is easily rotated over the exposed face of the lower plate A by the engagement of a suitable key with the slots $c'$ of the rivet-head.

The square sides of the rivet turn the cam-disk in the slot $b$, thus causing the plate B to be forced out away from plate A in the plane of their greater dimension. At the same time the locking-plate is moved in a corresponding degree, and the pressure imposed upon the latter by the close riveting together of the parts presses the fastening-catch F into the notches $f$, formed on the inner circular margin of the upper face of plate B.

The incline $f^1$ of these notches allows the catch F to slide or pass out readily from them in the line of direction in which the plate E is turned by the expanding of the shoe, while the abrupt side $f^2$ prevents the catch from sliding in the opposite direction. Hence, in expanding the shoe the key only is needed to operate the parts, and upon reaching a notch the pressure upon the spring-plate E forces the catch into the notch; but to contract the shoe, or allow the branches of it to approach each other, the plate E must be raised so as to allow the catch to clear the side inclines $f^2$. These notches are arranged at equal distances apart, preferably one-eighth of an inch, so that the shoe can be expanded in a graded degree; and to operate the parts the double-pronged key G and tool H (shown in Fig. 5 of the drawing) are preferably used, though these are immaterial to my invention.

Other devices may be used in substitution for these peculiar tools, and I only show the same as one means of operating the parts.

If desired, the cam-disk and spring locking-plate may be made in single instead of distinct pieces.

The heel-clips K are made independent of and detachable from the shoe, as shown in Fig. 8 of the drawings. The upper surface of each heel portion, respectively, of the two sections of the shoe is provided with a groove, $k$, in which the flange $k^1$ of the corresponding clip fits. The independent heel-clips are thus made capable of being adjusted lengthwise of the shoe, and after they have been put in any desired position in the sliding grooves they are secured in place by flanging the edges $k^2$ of the shoe over or against their adjacent sides. If desired, I may insert a blank piece between the clip and the inner end of the groove in which it slides when the clip is moved to the outer end or farther limit of said groove, so as to aid in keeping the clip from sliding forward.

In practice, the shoe is put on the contracted hoof so that clips K come in place within and abutting against the side of the heel-points, and the shoe is nailed to the hoof.

Upon finishing the shoeing, the key is engaged with the rivet-head, and the rivet, together with cam-disk and locking-plate, is turned so as to throw the catch F into the next notch.

The shoe should be expanded about one notch every four days until the hoof is sufficiently wide; then leave the shoe undisturbed for ten days, when a common shoe may be substituted for it.

Having fully described my invention, what I claim as new, and desire to secure by Letters Patent, is—

1. A horseshoe for contracted hoofs, consisting, essentially, in a toe-jointed shoe whose sections are provided with adjustable plates, operated by suitable cam mechanism, substantially as described.

2. The plates formed on the respective sections of a toe-jointed shoe, and provided with slots of different diameter, in combination with the cam-disk and locking-plate, the said parts being secured together by rivet, bolt, or other suitable engaging means, substantially as described.

3. The combination, with the sectional shoe-adjusting plates and the cam-disk, of the locking-plate, the three being suitably fastened together, and the said locking-plate having a projecting finger or catch, which latter is adapted to engage with a graded series of notches formed in the top surface of the upper adjusting-plate, substantially as described.

4. In a horseshoe, the detachable heel-clips, in combination with the grooves, substantially as described.

In testimony that I claim the foregoing I have hereunto set my hand and seal this 6th day of August, 1877.

JAMES A. RISDON. [L. S.]

Witnesses:
 GEORGE G. DEWOLF,
 ALEX. R. CRAWFORD.